United States Patent
Chierego et al.

(10) Patent No.: US 9,828,187 B2
(45) Date of Patent: Nov. 28, 2017

(54) METHOD AND DEVICE FOR SORTING BAGGAGE, SAID DEVICE BEING CAPABLE OF HANDLING UNSTABLE OR IRREGULARLY SHAPED MATERIAL

(71) Applicant: FIVES INTRALOGISTICS S.P.A., Lonate Pozzolo, Varese (IT)

(72) Inventors: Lorenzo Chierego, Varese (IT); Pierangelo Rusconi, Villa Cortese (IT); Attilio Soldavini, Ferno (IT)

(73) Assignee: FIVES INTRALOGISTICS S.P.A., Lonate Pozzolo (IT)

( * ) Notice: Subject to any disclaimer, the term of this patent is extended or adjusted under 35 U.S.C. 154(b) by 0 days.

(21) Appl. No.: 15/028,237

(22) PCT Filed: Oct. 6, 2014

(86) PCT No.: PCT/EP2014/071364
§ 371 (c)(1),
(2) Date: Apr. 8, 2016

(87) PCT Pub. No.: WO2015/052144
PCT Pub. Date: Apr. 16, 2015

(65) Prior Publication Data
US 2016/0257501 A1 Sep. 8, 2016

(30) Foreign Application Priority Data
Oct. 8, 2013 (FR) .................................... 13 59743

(51) Int. Cl.
*B65G 43/08* (2006.01)
*B65G 47/31* (2006.01)
(Continued)

(52) U.S. Cl.
CPC ............... *B65G 43/08* (2013.01); *B07C 1/04* (2013.01); *B65G 17/345* (2013.01); *B65G 43/10* (2013.01);
(Continued)

(58) Field of Classification Search
CPC ...... B65G 17/345; B65G 43/08; B65G 43/10; B65G 47/31; B65G 47/53; B65G 47/96;
(Continued)

(56) References Cited

U.S. PATENT DOCUMENTS 4,915,209 A * 4/1990 Canziani ................ B65G 43/08
198/357
5,588,520 A * 12/1996 Affaticati ............... B61B 13/08
198/370.06
(Continued)

FOREIGN PATENT DOCUMENTS

EP 0700844 A2 3/1996
JP 2009-179438 A 8/2009
(Continued)

OTHER PUBLICATIONS

International Search Report for FR 1359743 dated Jun. 25, 2014.

*Primary Examiner* — Gerald McClain
*Assistant Examiner* — Keith R Campbell
(74) *Attorney, Agent, or Firm* — Pearne & Gordon LLP (57) ABSTRACT

A method and device for sorting articles, including at least one station for automatically loading articles allowing transfer of the articles to one or several transport units, the station equipped with at least one device for transporting the articles and a system able to determine the position, the shape and the size of the articles, with a set of cross belt transport units, each unit provided with a supporting plate between two adjacent units. The device includes a system allowing detection of a possible change in position of an article on a
(Continued)

transport device during the acceleration phase. Maintaining the article in position on its unit(s) is ensured during its movement on the sorter, by supporting plates permanently ensuring supporting surface continuity between two units over a width substantially equal to the supporting surface of the belts and by the presence of vertical profiles on the belts.

13 Claims, 8 Drawing Sheets (51) Int. Cl.
*B65G 47/53* (2006.01)
*B65G 47/96* (2006.01)
*B07C 1/04* (2006.01)
*B65G 17/34* (2006.01)
*B65G 43/10* (2006.01)

(52) U.S. Cl.
CPC ............. *B65G 47/31* (2013.01); *B65G 47/53* (2013.01); *B65G 47/96* (2013.01); *B65G 2207/18* (2013.01); *B65G 2811/0626* (2013.01)

(58) Field of Classification Search
CPC ........ B65G 2811/0626; B65G 2207/18; B07C 1/04

USPC .................................................. 198/370.06
See application file for complete search history.

(56) References Cited

U.S. PATENT DOCUMENTS

| 6,074,723 | A | * | 6/2000 | Gennari | B65G 15/42 198/459.1 |
| 6,478,138 | B1 | * | 11/2002 | Edwards | B65G 17/345 198/370.06 |
| 6,976,572 | B2 | * | 12/2005 | Beck | B65G 43/08 198/358 |
| 7,080,725 | B2 | * | 7/2006 | Hishinuma | B65G 17/345 198/370.06 |
| 9,022,209 | B2 | * | 5/2015 | Ragan | B65G 23/04 198/619 |
| 2015/0360877 | A1 | * | 12/2015 | Shin | B65G 43/08 382/103 |
| 2016/0052722 | A1 | * | 2/2016 | Fujihara | B65G 17/345 198/358 |

FOREIGN PATENT DOCUMENTS

WO 00/32502 A1 6/2000
WO 01/24947 A2 4/2001

* cited by examiner

METHOD AND DEVICE FOR SORTING BAGGAGE, SAID DEVICE BEING CAPABLE OF HANDLING UNSTABLE OR IRREGULARLY SHAPED MATERIAL

CROSS-REFERENCE TO RELATED APPLICATIONS

This application is a U.S. National Phase application of PCT/EP2014/071364, filed on Oct. 6, 2014, claiming the benefit of FR Application No. FR 13 59743, filed Oct. 8, 2013, both of which are incorporated herein by reference in their entireties.

BACKGROUND OF THE INVENTION

(1) Field of the Invention

The invention relates to equipment intended for sorting articles via a sorting machine equipped with transport units with a crossed belt called "cross-belt".

Figure 1:
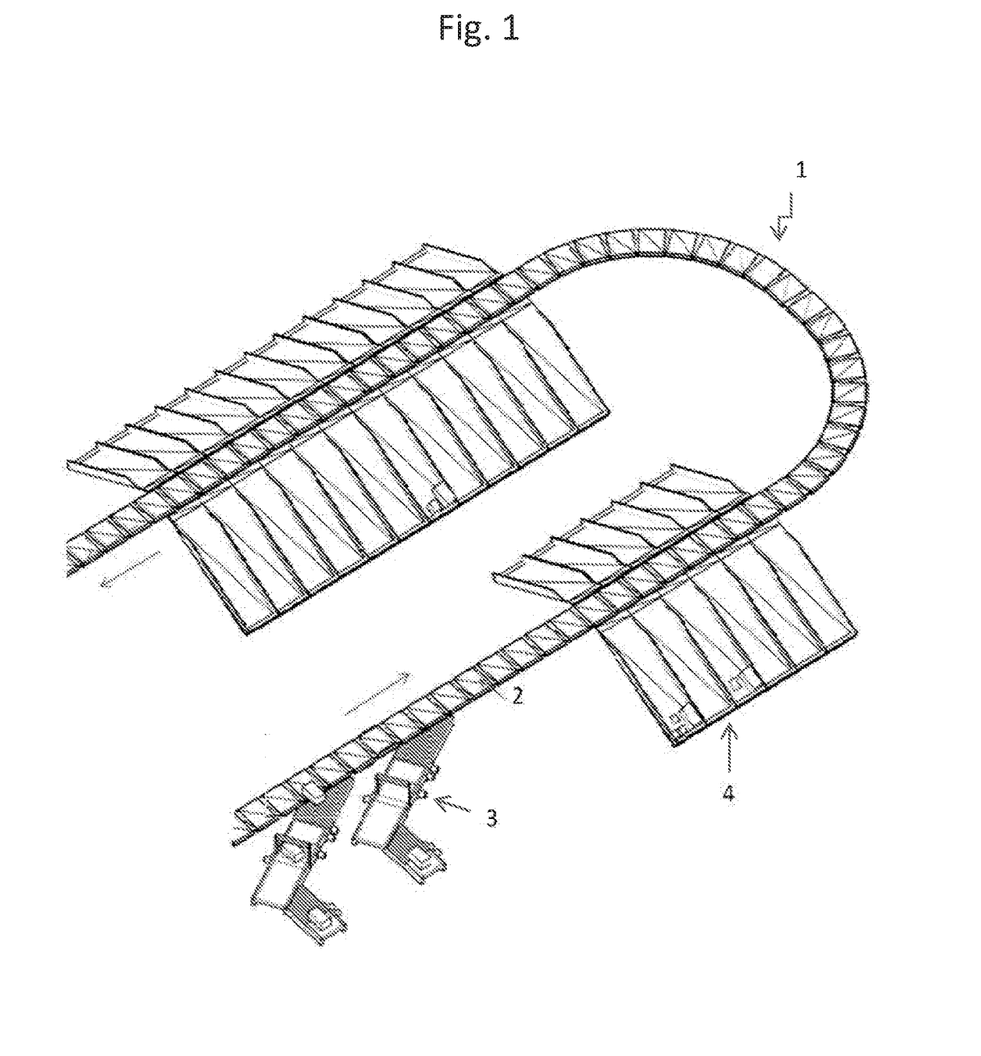
FIG. 1 is an overall diagram of an exemplary sorting machine.

The sorting machine 1 is illustrated in the general shape of FIG. 1: it is formed by a sequence of carriages which covers a closed trajectory along which there are entry automatic stations 3, which have to load the individual articles so as to be sorted on carriages of the sorting machine, and stations 4 for outputting the sorted articles, which generally consist of accumulation conveyors or chutes where all the sorted articles accumulate according to criteria of belonging to a same geographical destination or to the path of the transport means, like in postal applications, mail and baggage at the airport, or belonging to the same order from the customer, in logistic distribution applications.

The cross-belt sorting machine is characterized by the sorting unit on the carriage which is formed by a conveyor with a belt or transport unit 2, equipped with an electric motor and its control which may be actuated in both directions of the lines perpendicular to the displacement direction of the sorting.

The belt of the transport unit 5 is then actuated, during the loading of articles on board, for transferring articles without any significant deceleration and during unloading, for processing destination points.

The « cross-belt » sorting machine is already the reference in the postal, mail and distribution fields for its large capacity, its accuracy, its reliability in the processing of a wide range of articles: parcels, packets, envelopes, bags, flyers, flats.

The use of a conveyor belt with strong adherence, on the carriages of the sorting machine, for the loading and sorting of articles, gives the most simple and secure method even for articles which are more difficult to process, since it utilizes the support on the flat surface formed by the conveyor for sorting by actuating the belt with an acceleration much lower than the slipping limit of the packet on the conveyor. This gives the packet an accurate, reproducible sorting trajectory and independent of the characteristics of the object.

The « cross-belt » sorting machine is particularly adapted even to the processing of baggage, which is characterized by a great variety of shapes and of materials: there are baggage in a rigid plastic material, in leather, coated with a protective film, flexible bags, with straps, handles, wheels.

With this method, you may easily process articles which would give problems with other systems: baggage with laces or with straps or with metal parts may create problems with a sorting system with pushers, baggage with a protective film may have difficulties in sliding for example in applications with a sorting system with tilt trays.

The « cross-belt » system does not have other parts in motion on the belt of the transport unit, in particular no elements which, like the tilt trays, may generate dangerous apertures wherein the baggage may be trapped or portions which may cause significant mechanical interferences with fixed portions along the path of the machine.

But in order to make the most out of the favorable characteristics of the « cross-belt » system for sorting baggage, it is necessary to find a solution with a contradictory aspect: on the one hand, the « cross-belt » system is particularly suitable for difficult pieces of baggage, mainly because the sector for the transport and sorting is simply formed by the planar surface of the transport unit, capable of accelerating each type of baggage, on the other side, the planar transport surface is not the most adapted for not very stable baggage which may roll on a planar surface when they are subject to accelerations.

(2) Description of Related Art

In the prior art systems are known which allow handling of voluminous parcels on cross-belt systems. WO0124947 describes the deposition of the voluminous parcel on two successive units provided with a supporting plate between two adjacent units. However, this solution is not sufficient for processing unstable parcels during acceleration phases in the cross-belt systems.

During changes in direction along the path of the machine, the piece of baggage is subject to an inertia response which occurs with a centrifugal acceleration relatively to the transport system, so that the unstable piece of baggage may roll on the side of the sorting machine: the consequences may be that the baggage miss the starting of the flight but this also may cause serious damages for the baggage and for the machine.

Today, the « cross-belt » and « tilt tray » sorters, the latter widely used in airport applications, may operate at a speed of up to 3 m/s, in many cases, this is the most simple solution to the problem of connection between the input areas of the baggage and the storage areas for preparation for the flights and the application often requires long distances and reduced passage times. However, the requirement of having great speed and circuits with often complex shapes, with many curves for adaptation to the available space, are conditions under which the unstable pieces of baggage may cause problems.

The plastic containers are often used for processing unstable pieces of baggage, but the use of containers causes complications and additional handling for achieving return circuits and for distributing empty containers in the entry points, and therefore the great interest is to limit their use.

BRIEF SUMMARY OF THE INVENTION

The invention aims at improving the capacity of the « cross-belt » system in the processing of articles and in particular of unstable articles.

The invention notably consists in a device for sorting articles, including unstable articles, comprising at least one station for automatic loading of articles allowing transfer of the articles towards one or several transport units, the station being equipped with at least one means for transporting articles and with a system able to determine the position, the shape and the size of the articles, a set of transport units with a cross-belt, each unit being provided with a supporting plate between two adjacent units, at least one output section for the sorted articles, the system of which allowing detection of a possible change in position of one article on a transport means during the acceleration phase of the transport means for transferring the article on one or several units, allowing the article to be maintained in position on its transport units during its displacement on the sorting machine. Supporting plates permanently ensure continuity of a supporting surface between two units over a width substantially equal to the supporting surface of the belts.

According to a first exemplary embodiment of the invention, the transport units comprise belt conveyor rollers, the contact area of which is shorter than the belt width.

In this case, curved parts give the possibility of maintaining the portion of the belt not supported by the rollers. These parts have a tilted slot relatively to the plane defined by the supporting surface of the articles on the transport unit giving the possibility of receiving the supporting plates.

The transport units comprise means for adjusting the tilt of the rollers giving the possibility of obtaining a symmetrical separation of the ends of the rollers.

According to a second embodiment of the invention, the transport belts of the device for sorting articles also comprise vertical profiles ensuring the hold of the articles on the transport units during their displacements on the sorting machine, notably during bends leading to a high speed of acceleration of the articles.

In this case, monitoring and control pieces of equipment detect the position of the vertical profiles and position the belts before the loading station and during the loading of the articles in order to place the articles between vertical profiles when they are found on the transport unit.

In this embodiment of the invention, monitoring and control pieces of equipment allow detection of a movement of the vertical profiles of a belt when an article is conveyed and an action on the motor of the belt so as to position the vertical profiles in their optimum transport position.

The invention also relates to a method for sorting articles, including unstable articles, by means of a sorting machine consisting of cross-belt transport units, each unit being provided with a supporting plate allowing continuity of the supporting surface between two adjacent units, of at least one automatic loading station for articles equipped with a means for transporting articles and of a system able to determine the shape and the size of the articles, characterized in that a possible change in position of an article is detected on the transport means during the acceleration phase of the transport means for transferring the article onto one or several transport units. If the change in position of the article is too significant for allowing its automatic handling by the units, the loading station discharges it towards a manual processing area. If the change in position of the article is small, the loading station dynamically corrects the position of the article on the transport means in order to again find a position compatible with the transfer on the units. If the change is significant, the loading station sends back the article upstream from the system so as to allow determination of the new position of the article and to re-initiate a sequence for loading at a reduced speed towards one or several loading units. The transfer is carried out towards one or several loading units while ensuring that the article is maintained in position during its displacement on the sorting machine as far as its output destination.

In a non-limiting example, the method, object of the invention, notably applies belts equipped with vertical profiles which are pre-positioned before the loading station and then moved during the transfer of the articles on the transport units in order to place the articles between the vertical profiles when they are found on the transport unit.

In this case, the detection of a movement of the vertical profiles of a belt when an article is conveyed, gives the possibility of acting on the motor of the belt in order to position the vertical profiles in their optimum transport position.

The invention is particularly adapted for the sorting of long articles which may be placed on at least two adjacent transport units by ensuring the positioning of the long article between the vertical profiles of at least two transport units.

We proceed with analysis of the problems which may occur confronted with an unstable piece of baggage on the «cross-belt» sorting machine.

For the loading on the sorting machine, the piece of baggage is accelerated by the conveyors of the loading station 3 of the machine, oriented at 30° relatively to the direction of the sorting machine, at the speed required for transfer onto the sorting machine. With the actuation of the belt 5 of the transport unit 2 of the sorting machine which receives the piece of baggage, the typical characteristic of the "cross belt" is obtained: whether the transfer takes place in the absence of accelerations which may affect the stability of the baggage. Indeed, during the transfer, the speed vector of the piece of baggage is equal to the speed vector of the belt of the conveyor on board (detail of FIG. 1).

The loading station is equipped with optical sensors and with control logic which allow correction of the effects due to the instability of the baggage during the acceleration phase, and also capable of interrupting the loading phase when an excess of sliding or rolling of the baggage is detected.

In the latter case, the proposed method includes the possibility that the automatic loading station may automatically send to the manual processing station the piece of baggage after excessive sliding or rolling.

In the case when the sliding or the rolling causes a too significant error for being dynamically corrected, the station is capable of stopping the object on the line and to automatically execute a new loading procedure, by reserving two adjacent transport units for the unstable object so as to have a safety margin. The loading trajectory is executed by using a very reduced acceleration value: the object is loaded and routed towards the output destination, or to an outlet for manual processing, if required, for avoiding the risks.

Figure 15:
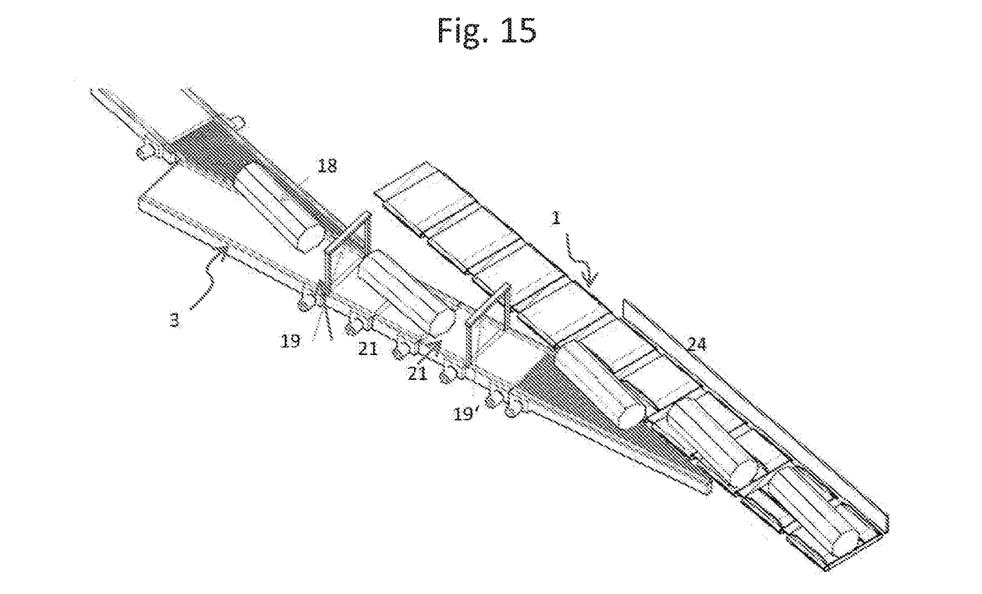
FIG. 15 is a diagram of a sequence for loading a long product.

Further, it is possible to equip the loading station with a solution for automatically discharging baggage which have been identified as particularly unstable: in this case, after having stopped the piece of baggage on the loading line, the movement of the conveyor belts is reversed, so as to send the piece of baggage to a chute for manual processing (FIG. 15).

During the transfer phase of the piece of baggage on board, the belt 5 of the carriage is actuated; in this way, the piece of baggage is transferred on the transport unit 2 with exactly the same speed components of the conveyor: in the machine direction and in the direction orthogonal to the direction of the machine. Thus, the transfer of baggage on board occurs without any acceleration. However, after the transfer, it is necessary to decelerate the conveyor for stopping the piece of baggage on board; the deceleration value is reduced, but it may further cause a loss of stability if the piece of baggage is unstable with possible rolling in the direction orthogonal to the direction of the machine. In this case, the vertical barriers (24, FIG. 7) on the side of the sorting machine, opposite to the loading station are efficient for stopping the piece of baggage on the conveyor of the carriage.

The use of the vertical barrier does not pose any problem since it cannot cause interferences in the case of parts such as baggage straps which fall from the conveyor belt, further the barrier is installed along a rectilinear trajectory. Therefore there is no tightening effect between the carriage and the vertical barrier, as this would be the case in a curved trajectory.

Figure 3A:
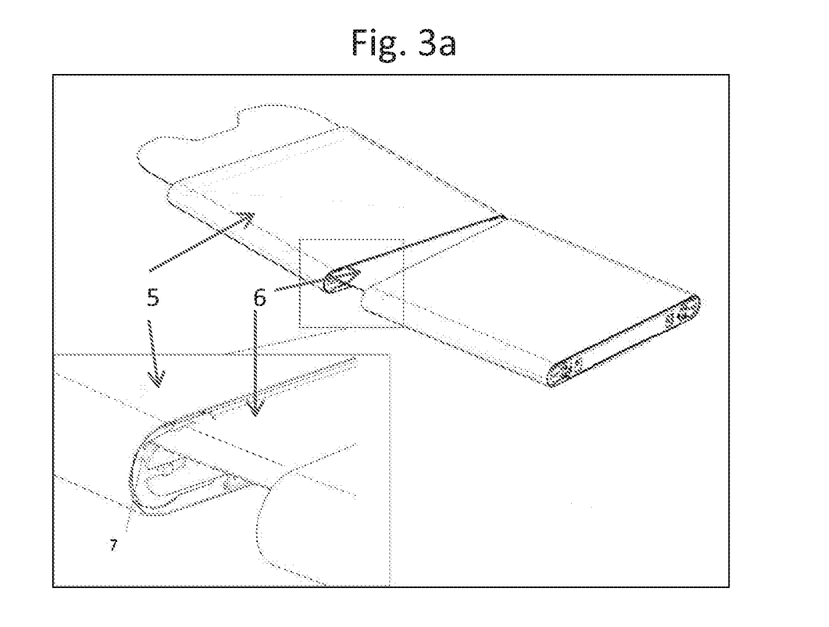
FIG. 3a is a diagram of 2 loading units in a bend according to the invention.

However, the interference of a not very stable piece of baggage with the vertical barrier may cause retraction of baggage relatively to the theoretical position of the loading on the conveyor of the carriage: because of the friction with the vertical barrier, the piece of baggage may in fact slide or roll backwards on the separation table between the carriages and partly on the conveyor of the next carriage. In this case, the proposed method provides that the sorting machine be totally tolerant towards pieces of baggage which roll in the direction opposite to the movement of the machine; regardless of the position of the piece of baggage, it should not cause any interferences, even in correspondence with the curves of the sorting machine, where the carriages rotate relatively to each other. In order to attain this goal, a supporting plate 6, (FIG. 3) in plastic material is placed between two adjacent conveyors, attached on the side of one of them and penetrating into the side of the other: with the feature of completely covering the surface between the conveyors, even in bends and as far as the side ends of the conveyors, by means of an innovative design. The method also implies the use of optical sensors and control logic for determining the final position of the piece of baggage on the machine after the loading: in the case of rolling, the piece of baggage may be partly on the table between the conveyors or on the next belt, either free or leaning against another piece of baggage.

When the piece of baggage cannot be sorted towards its destination safely, the monitoring system sends the piece of baggage to a manual processing station, which is suitably dimensioned so as to also receive two pieces of baggage sorted at the same time because one of the two has rolled against the other.

In order to be capable of sorting in every case the piece of baggage which is localized in a wrong location on the sorting machine, it is also necessary that the piece of baggage which may be processed with a minimum size, which has rolled on the table between the cells, however has sufficient contact with one or two of the conveyors. It should be avoided that the baggage remains on the supporting plate 6 without being able to be sorted, since they would miss the starting of the flight and it would also be necessary to stop the sorter for removing them. In order to satisfy all the conditions expressed by the method, it is necessary on the one hand that the space between both adjacent belts be covered by a low friction table which may support any type of baggage, and also that there be no opening also in the bends. On the other hand, it is necessary that the supporting plate be reduced in length in order to be able to sort a piece of baggage with the minimum size, which would be placed between both conveyors.

Let us now consider the problem posed by the unstable piece of baggage in correspondence with the curves in the direction of the sorting machine, in particular when the radius of the curves is limited and a high speed is required. For example, with a radius of curvature of 4,000 mm and a speed of 2.5 m/s, the centrifugal acceleration is 1.6 m/s$^2$; if the speed is 3 m/s, the acceleration is 2.2 m/s$^2$. In this case, the piece of baggage is subject to a significant lateral force, if it is not very stable, it may roll sideways.

In order to avoid that not very stable pieces of baggage laterally fall in a bend, the vertical barriers which follow the path of the bend of the machine, are not a safe solution. They are often used, but with the risk of serious damages for the baggage and for the sorting machine for the following reasons. The sorting machine is equivalent to a sequence consisting of carriages with a certain pitch. In the case of baggage, this pitch is greater than one meter; in the curve the carriages of the machines are positioned according to a polygonal line, between the vertical barrier and the carriages, there are vertical slots, particularly large when the radius of curvature cannot be very large relatively to the pitch of the carriages. Baggage and straps may be inserted into the slots, and in this case may cause serious mechanical interferences because the vertical slots are closed along the bend when the carriages move in the bends, thereby generating conditions for very dangerous shearing for the baggage and for the machine.

For these reasons, the use of vertical barriers in bends, in order to retain the unstable pieces of baggage on the sorting machine, is not an adequate solution since it reduces the reliability and the availability of the machine.

Figure 8:
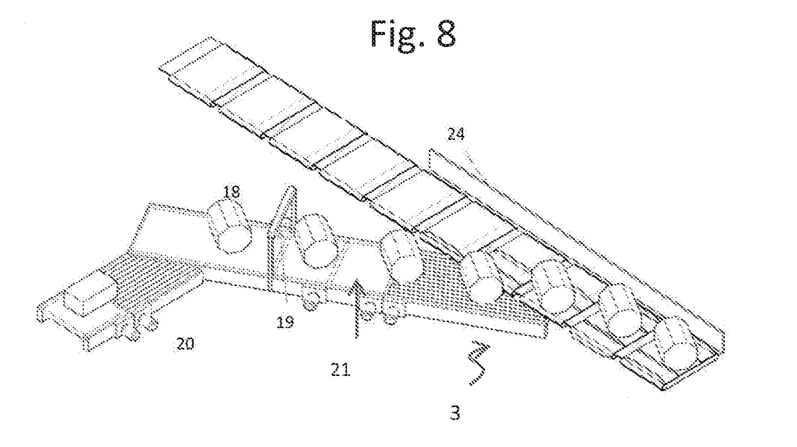
FIG. 8 shows the sequence for loading a poorly positioned not very stable piece of baggage.
Figure 9:
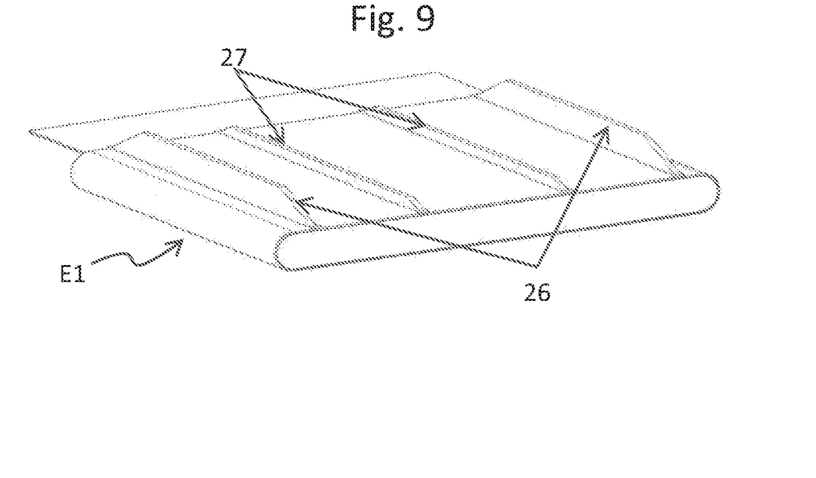
FIG. 9 is an illustration of vertical profiles.

In order to improve the processing of not very stable baggage in the bends, the method proposes that the conveyor of the sorting machine be equipped with vertical profiles 26 for acting against the rolling of the baggage (FIG. 9). Before the loading station, the position of the conveyor is adjusted suitably so that, with actuation of the conveyor during the loading phase, the piece of baggage be centered relatively to the vertical profiles 26. FIG. 8 shows a sequence for loading the unstable and poorly oriented piece of baggage, and then subject to possible rolling in the bend. The units 2 are prepared before the loading according to the configuration E2 of FIG. 14. Once the loading is finished, as illustrated in FIG. 8, the conveyor 5 assumes the configuration E1 of FIG. 9 with centered baggage between the external vertical profiles.

The central profiles 27 may be added, of a lesser height and made in a material with less hardness than the outer profiles, capable of being adapted to the base of the baggage, in order to improve the friction conditions, by cooperating with higher profiles for the processing in a bend and for the sorting of not very stable articles. The method also proposes corrective actions for maintaining the efficiency of this solution in bends, especially when the application requires speeds of more than 2.5 m/s. In this case, the conveyor may be moved by the inertia response of baggage, since the force acting on the baggage because of the centrifugal acceleration attains the value of the frictional force between the lower face of the belt and the surface on which it slides.

The method proposes active control of the position of the vertical profiles with sensors for measuring the distance, optionally for correcting the position and then exerting a braking function along the curve, by acting on the servo-motor of the transport unit 2.

By applying the preceding solutions, the method also allows processing of baggage or very long parcels, which requires the loading of two or several loading units 2, including those which are very unstable like long parcels with a narrow supporting base, long bags for sport equipment or wrapped articles with a nearly cylindrical shape. For these types of articles, the preferred solution is the one with the loading stations oriented at 15°, according to the loading station 3 of FIG. 15, so that the long piece of baggage is already oriented in a favorable direction for transfer onto the sorting machine, the speed component of which orthogonal to the direction of the machine is of only 26% of the speed of the machine and the required deceleration for stopping the parcel on the machine is low, of the order of 1.5 m/s2. The loading station 3 will be capable of simultaneously actuating the transport units 2 intended to receive the piece of baggage or the long parcel 18 so that at the end of the loading, it arrives between the vertical profiles 26 of the conveyors where it was loaded, as indicated in the detail of FIG. 15.

Thus in applications for airport baggage, the proposed method for processing parcels including very long and not very stable parcels, may also be applied in the field of sorting installations for mail in order to widen the range of parcels which may be directly processed by the sorting machine, comprising a large portion of so-called irregular articles which are usually processed manually.

The problems discussed above cannot be solved by using presently available solutions in the different embodiments of the "cross-belt" sorting machine. The conditions to be observed may be summarized in practical terms; the supporting plate between adjacent belts should not have any apertures, even in a bend, should be compatible with large size conveyors, of about 1,000×1,000 mm, which are required for processing baggage on carriages with a pitch of about 1,200 mm; it should extend as far as the end of the conveyors, should give the possibility of producing bends in both directions with an average radius of curvature not greater than 4,000 mm. Further, the supporting plate should be in a material with low friction installed at a few millimeters, for example 3 mm, below the level of the transport belts 5. The supporting plate should be sufficiently short, not more than 200 mm, in order to avoid that pieces of the baggage with a minimum size cannot remain blocked there, without the possibility of being sorted.

There already exist solutions for the conveyor of the "cross-belt" with a supporting plate which may penetrate into the side of the adjacent conveyor, but the latter require that the table be narrower relatively to the length of the belt, in order to avoid any interference with the rollers: the «cross-belt» conveyors for baggage have to be particularly robust, and the rollers have to be necessarily of a large diameter, for example 100 mm, therefore, for avoiding any interference with the rollers, the supporting plate leaves wide apertures on the sides. These apertures are completely open or closed depending on the direction of the bends: thus, the apertures may catch pieces of baggage exposing the risk of serious damages for the sorting machine and for the baggage.

BRIEF DESCRIPTION OF THE SEVERAL VIEWS OF THE DRAWING(S)

The invention consists, except for the arrangements discussed above, in a certain number of other arrangements which will be discussed more explicitly hereafter in connection with an exemplary embodiment described with reference to the appended drawings, but which is by no means limiting. In these drawings.

DETAILED DESCRIPTION OF THE INVENTION

In order to meet the conditions, at the basis of the method in the case of large sorting units for baggage, for example 1,000×1,000 mm and bends with a maximum radius of 4,000 mm, the present application proposes an innovative solution for the design of the conveyor of the sorting unit, based on the fact that both rollers 9 and 10 are shorter than the width of the conveyor, so that the supporting plate 6 may arrive at the ends and it may turn in the bend without any interference.

Figure 2:
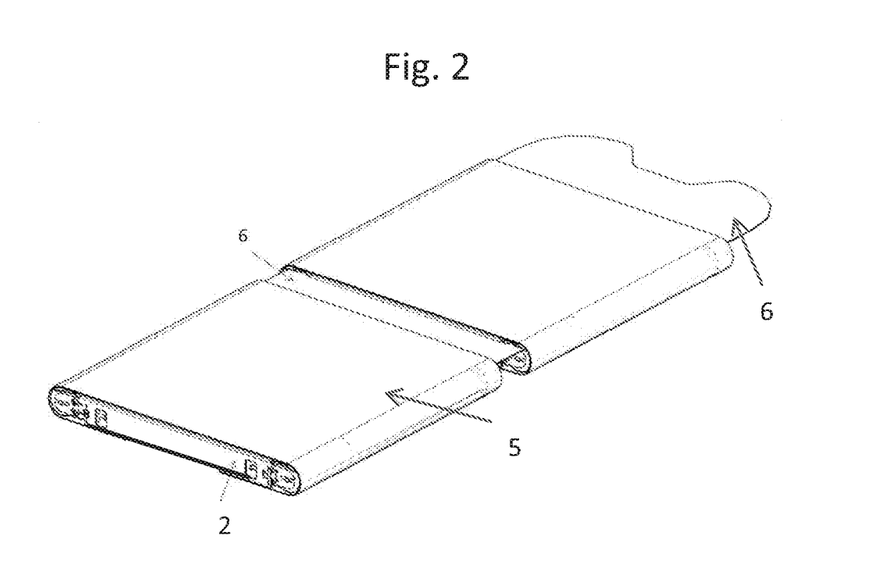
FIG. 2 is a diagram showing in detail 2 loading units according to the invention.
Figure 3B:
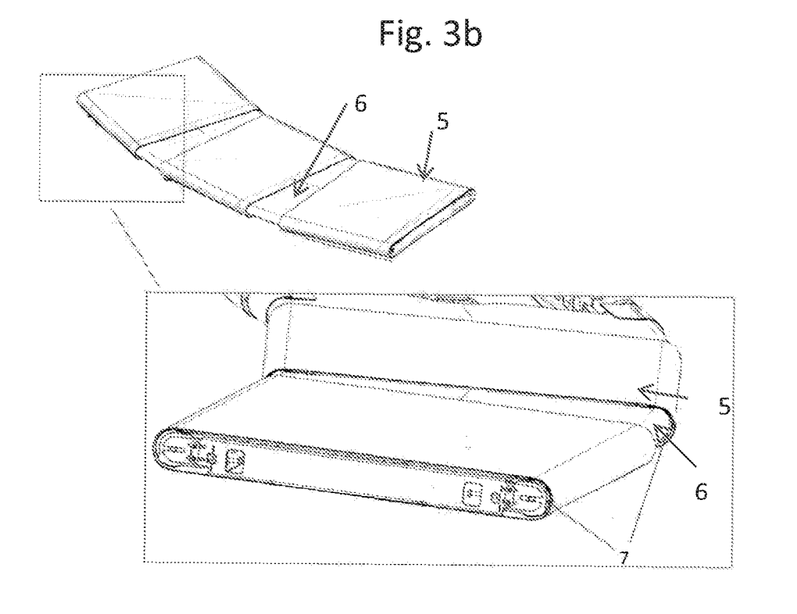
FIG. 3b is a diagram of 2 loading units in a bend according to another embodiment.

FIG. 3 shows that the slot 7, where the supporting plate 6 may rotate between the transport units 2, extends to the ends, by the absence of interference between both rollers. FIGS. 2, 3a and 3b show sorting units according to the invention on a rectilinear and curved trajectory. In order to obtain this result, the new embodiment of the loading unit 2 (FIG. 4), consists of using both motor and tensioned rollers 9 and 10 according to the version with a set axis, but with the bearings integrated into the cylinder, which gives us the possibility of having the outer cylinder of the rollers shorter relatively to the shaft, so that it is even shorter than the width of the belt 5. The contact surface between the outer cylinder and the belt corresponds to the contact area Z. In this way, a part 11 may be installed on the set shaft, with a curved surface which assumes the place of the missing portion of the cylinder: the curved surface exactly follows the profile of the outer cylinder of the roller, so that the belt 5 may also slide over the set portion, by ensuring continuity. The curved surface 11 allows sliding of the belt but with greater friction on one side, this problem has a solution, described in a following paragraph.

Figure 4:
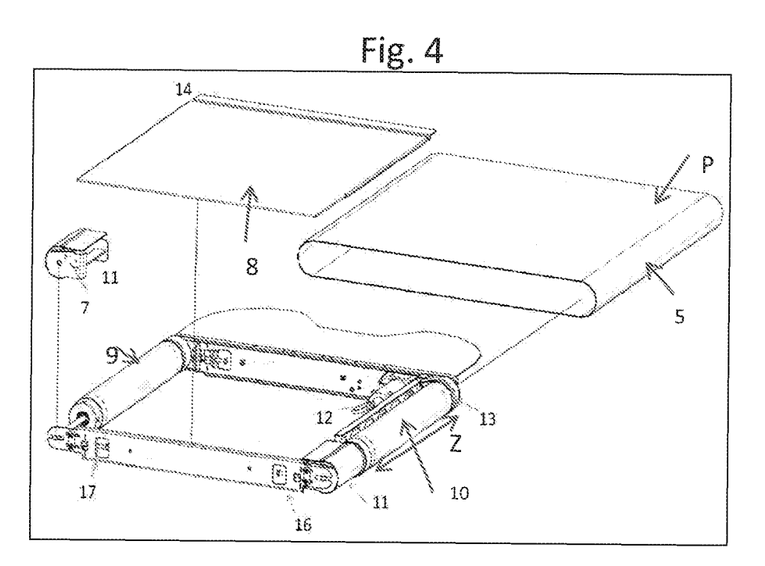
FIG. 4 is a diagram of an exploded view of a transport unit.
Figure 5:
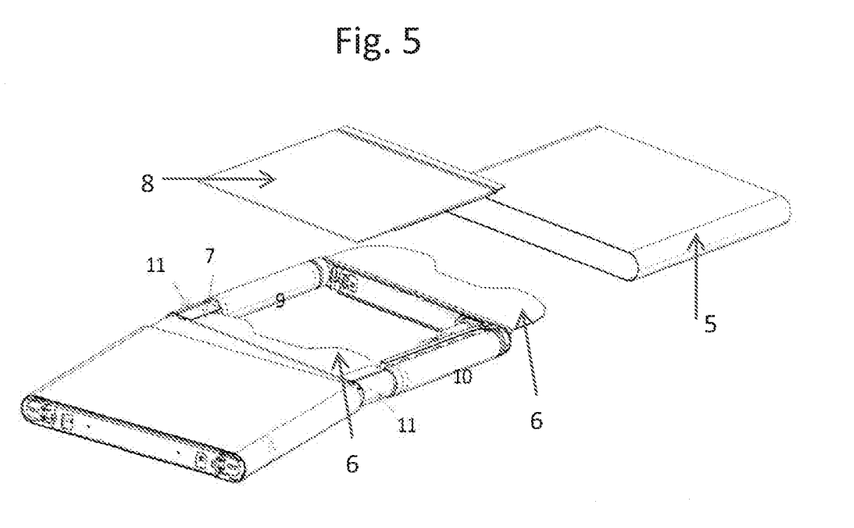
FIG. 5 is a detailed view of 2 transport units in a curve.

The part 11, being a set portion mounted on the shaft, gives the possibility of obtaining a slot 7 below the curved surface (detail of FIG. 3), which illustrates the continuity of the slot on the side of the conveyor in order to receive the supporting plate 6 so that it may extend as far as the end of the belt, and may also freely rotate in correspondence with the bends, not encountering any interferences with the rollers. By the fact that the parts with a curved surface 11 are mounted on the same shaft of the rollers, the belt 5 may «slide with continuity» on the fixed portion, even if the position and the tilt of the roller are modified for tensioning and centering the belt 5. FIG. 4 shows an exploded view with the tensioning roller 9: on its shaft is mounted the part 11 with the curved surface for the sliding of the belt and the slot 7 or the supporting plate 6 may slide between the transport units 2.

The slot 7 is tilted relatively to the plane P defined by the supporting surface of the articles on the unit 2. It is conveniently shaped and has a low friction coefficient so that it may push the plate at a deformation which approaches the curve of the surface on which slides the belt, so that the plate may achieve total coverage between the belts, also in the bend, as shown in FIG. 3a. The plate may be made with polymers for the required resistance and elasticity characteristics.

The curve of the supporting plate 6 downwards, visible in the detail of FIG. 3a, for covering the surface of the transport even in the bends, is also very useful for reducing the possibility of interference during the loading phase with the rigid protruding portions of the baggage such as wheels, metal parts, edges.

An alternative embodiment of the slot 7 is illustrated in FIG. 3b. In this alternative embodiment of the invention, the slot 7 has a radius of curvature slightly less than that of the roller so that the supporting plate 6 follows as close as possible the curve of the belt 5 at the passage of the rollers 9 and 10.

The solution of the shorter rollers 9 and 10 than the width of the belt 5 however implies that the belt, on the side where it slides on the curve surface 11, is subject to a frictional force greater than the one present on the other side: this asymmetrical effect requires suitable compensation for maintaining in the long run the centering condition of the belt, compatible with the fact that the belt is actuated in both directions.

Figure 6:
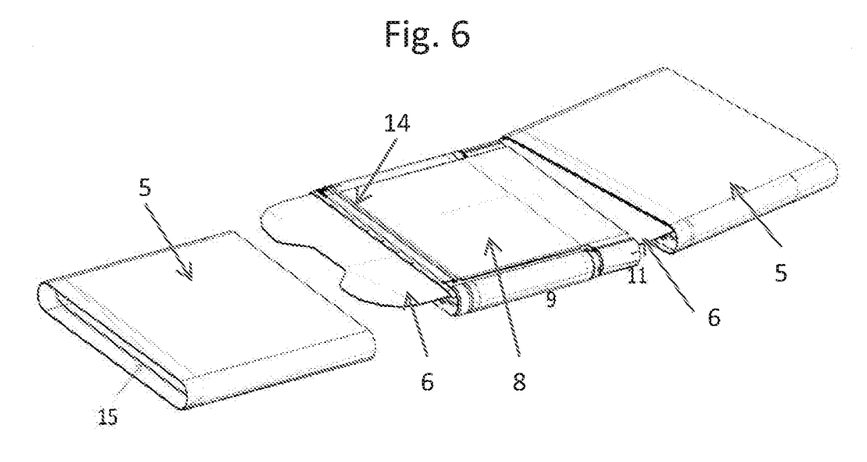
FIG. 6 is another detailed view of 2 transport units in a bend.

The studied solution is based on the use of cylindrical rollers, non-profiled for the self-centering function, the belt having a side guiding profile 15 on the inner face, on the side opposite to the one on which the belt slides on the fixed surface 11. The solution is illustrated by FIG. 6: the guiding profile 15 passes into a groove 14 present on the sliding table 8 of the belt. The profile of the belt is housed in driving 10 and tensioned 9 rollers in a narrower cavity relatively to the one of the sliding table 8. The profile 15 guides the belt 5 so that it remains centered during the actuations in both directions.

But the task of correcting stationary tension asymmetries of the transport unit 2 is not left to the profile, since in this case, the latter would be subject to constant pressure, to wear on the sides and the profile may even leave the guide, causing critical damages to the conveyor.

Also, for compensating the asymmetries of the distribution of the forces along the rollers, mainly because of the greater friction on one side, but also of other secondary effects such as the different elasticity of the belt 5 because of the presence of the profile 15 welded on the other side, and manufacturing imperfections, the new design provides the addition of adjustment of the tilt also on the driving roller, as well as on the tensioning roller. FIG. 4 shows the driving roller 10 with the tilt adjustment 16 and the tensioned roller 9 with the adjustment 17 of tensioning, which is also present on the other side. In order to compensate for the asymmetrical effects, it is necessary to apply a greater tension on the side opposite to that of the profile, obtained by increasing the distance between the rollers on the same side. The increase in the distance between the rollers on one side is obtained by symmetrically tilting both the tensioning roller 9 and the driving roller 10. In this way, there is no torque acting on the guiding profile 15 of the belt, and therefore the reliability and the durability of the belt are not affected, as this would occur if only the adjustment of the tilt of the tensioning roller was only used. The required tilt for the driving roller 10 is generally less than 0.3 degrees, compatible with the use of a standard transmission belt 13 with the electric motor 12.

In order to reduce the length of the table, in order to avoid that a piece of baggage with minimum dimensions remains on the table, it is necessary that the motor 12 and the driving belt 13 of the roller do not form an obstacle to the rotation of the conveyor. Therefore, the preferred solution is an electric motor with a belt transmission on the driving roller, installed inside the belt, on the side opposite to the one intended to receive the supporting plate, as illustrated in FIG. 4.

Let us now consider the additions related to the belt 5 in order to reduce the possibility that a not very stable piece of baggage may roll in the bends of the sorting machine. The proposed solution (FIG. 9) is to provide the belt with two other profiles 26 with a height of 80-100 mm for preventing the rolling, and also preferably with two internal profiles 27 with a height of about 30 mm, easily deformable for adapting to the surfaces of the unstable piece of baggage in order to increase the stability and improve the adhesion. The number of vertical profiles, the height and their arrangement may vary, the arrangement of FIG. 9 is an example.

Figure 10:
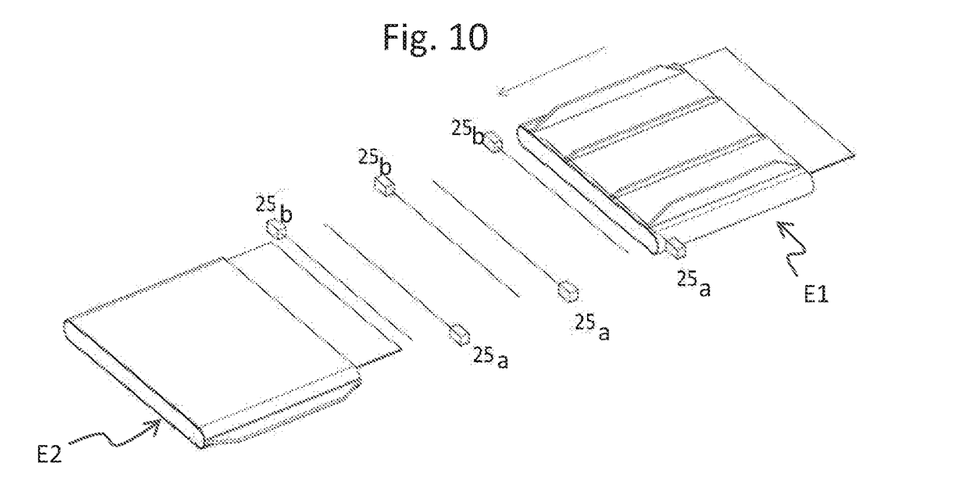
FIG. 10 is an illustration of a pre-positioning area.
Figure 11:
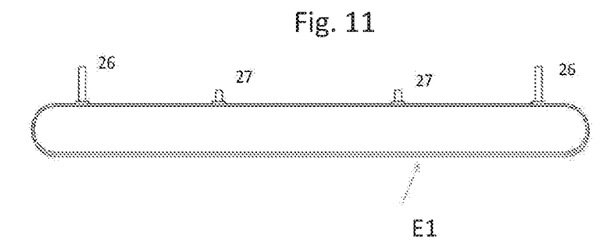
FIG. 11 is the position of a loading unit after the loading.

The conveyors with profiles are generally used for limiting the sliding and the rolling of the transported articles in applications requiring very sharp changes in level. The large diameter of the rollers of the conveyors on the « cross belt » carriage for baggage is compatible with the specifications for the use of solutions already available commercially. In FIG. 10, the « cross-belt » conveyor is shown in the position E2, ready to receive the piece of baggage during the loading phase, so that, with the actuation of the belt during the loading, the piece of baggage is inside the area delimited by both high profiles 26 with the belt in the position E1.

Figure 13:
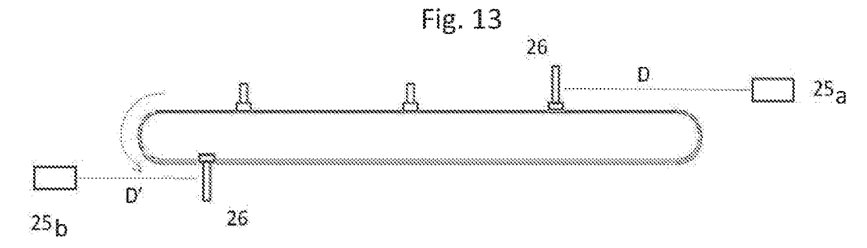
Figure 14:
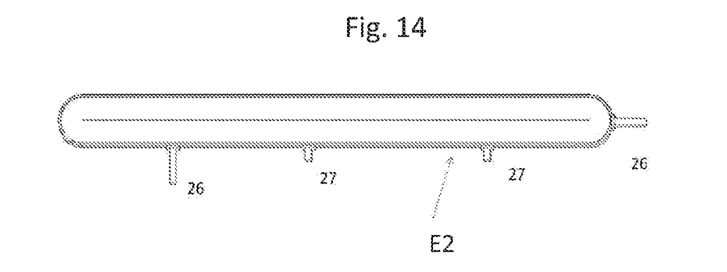
FIG. 14 is the position of the belt before the loading.

The positioning of each « cross-belt » belt is controlled by a control position which precedes a group of automatic loading stations on the « cross-belt » machine. Each conveyor is actuated (FIGS. 12 and 13) so that the position E2 of the profiles is as shown in FIG. 14. The positioning of the conveyor requires good accuracy and therefore it occurs in a closed loop: the actuation of the conveyor is continuously adjusted by measurement at the position of the profiles.

The pre-positioning station is provided with laser sensors 25 for detecting the vertical profiles 26 and 27 providing the measurement of the distance. The sensors 25 are positioned on the sides of the machine, as shown in FIG. 10: the sensors 25a on one side exploring the upper face of the transport unit 2, while the detectors of the other side 25b are for the lower face of the transport unit 2. These sensors on each side are mutually positioned at a distance smaller than the width of the conveyor, so that the control system, which measures the advance of the carriage of the sorting machine, at each instant, may sequentially read the sensors, and thus reconstruct a continuous feedback signal for the accurate positioning of the profiles of the belt 5.

Figure 12:
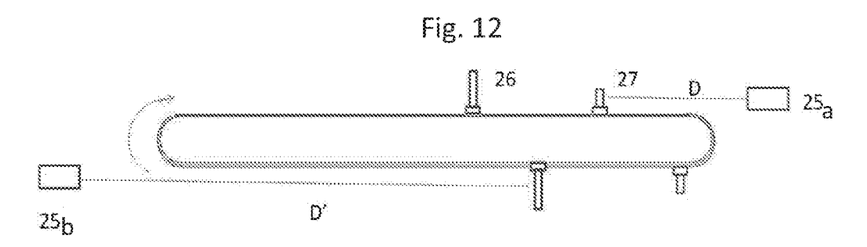
FIGS. 12 and 13 illustrate different steps during the positioning of the transport belt.

The pre-positioning station also comprises devices for transmitting the command for actuation of the servo-motors of the transport unit 2: during the passing of the carriage, its belt is set into rotation for attaining the configuration E2 of FIG. 14, i.e. with the sensor 25a relatively to the upper face of the belt which does not detect vertical profiles, while the sensor 25b relatively to the lower face of the belt which detects the profile at a given reference distance. FIGS. 12 and 13 show two different starting situations and the action of the control system for arriving to the position E2.

At the output of the synchronizing conveyors or transport means 21, a system 19, 19' allows detection of a possible change in position of the baggage 18 and the significance of the latter. This system for example consists of a barrier of photoelectric cells 19, 19' or of two successive barriers. These barriers may have side or vertical detection. The system 19, 19' is used by the control system to check whether there has been a change in position, for example sliding or rolling of baggage during the acceleration phase. The system 19, 19' gives the possibility of appreciating the significance of this change in position of the piece of baggage 18 on the transport means 21 of the loading station 3. In the case when the change in position is limited, the compensation or the correction of the position is accomplished dynamically, for example by generating a speed deviation between the transport belt of the transport means 21 where the piece of baggage is found and the next transport belt. The repositioning is thus achieved during the passing of the piece of baggage from one belt to the other. The transport belt may consist of several parallel belts which may be accelerated, slowed down or stopped independently so as to be able to reposition the baggage having changed position.

If the detected change in position is significant for dynamic correction, the piece of baggage is stopped, and then the movement of the transport belt of the transport means 21 of the loading station 3 is reversed for bringing back the piece of baggage upstream from the system 19, 19'. This change in direction of the piece of baggage may be sufficient for placing it in a stable position, in a suitable position for a new loading phase. In the case of a piece of baggage having had a significant change in position, two adjacent transport units (2) are reserved for the piece of baggage. The latter is transferred on board these two transport units by a loading trajectory with small acceleration. It is generally directed towards a manual workstation.

Figure 7:
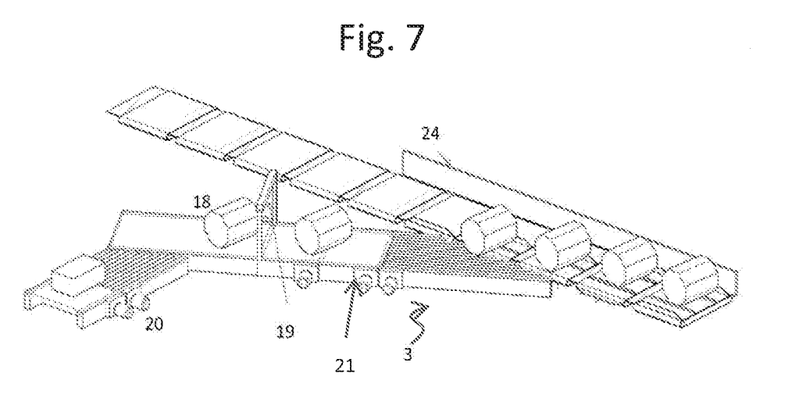
FIG. 7 shows the sequence for loading a not very stable piece of baggage.

FIG. 7 shows the sequence for loading a not very stable piece of baggage, for example a bag with an almost cylindrical shape, properly oriented relatively to the loading conveyor 20: the piece of baggage passes under the vertical optical barrier 19, consisting of independent photoelectric cells installed in parallel and with a very small pitch, of the order of 30 mm, for carrying out an accurate analysis of the piece of baggage in transit.

The barrier comprises a line of infrared ray emitters and a line of corresponding receivers: the transmission of light from the emitter to the receiver is cut by the passing of the piece of baggage. The control system reads at regular intervals the condition of the emitters in order to determine the shape, the position and the orientation of the baggage, information required for properly executing the loading onto the sorting unit. After having passed under the optical barrier, the piece of baggage is gradually accelerated by synchronizing conveyors or transport means 21 up to the loading speed, i.e. 15% more than the speed of the sorting machine, since the loading station is oriented at 30° with respect to the direction of the sorting machine.

Figure 16:
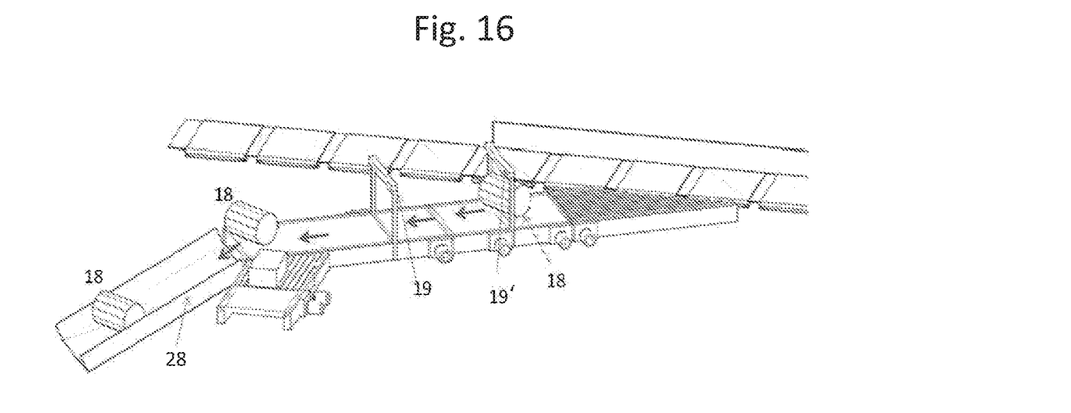
FIG. 16 is a schematic view of an automatic rejection sequence.

In the case of a particularly unstable piece of baggage, detected as being obviously rolling, the fast automatic rejection procedure may be directly actuated on the loading station (FIG. 16). The belts of the loading station are stopped, and then the movement of the belt is reversed so that the unstable piece of baggage, and optionally a following piece of baggage already present on the line, is sent back to a chute 28 placed at the beginning of the loading line for manual retrieval, rapidly releasing the loading station 3.

FIG. 8 shows the loading of an unstable piece of baggage which passes under the optical barrier with a wrong orientation. In this case, during the deceleration on the sorting unit, the baggage may roll in a direction perpendicular to the machine: the confinement profiles of the conveyor may not be sufficient for preventing rolling, however the pieces of baggage will be stopped by the vertical barrier 24 located in correspondence with the loading station. In this case, the piece of baggage may further roll in the direction opposite to the machine. The total coverage between the belts, already described, avoids interferences or damages; however it is required to localize the final position of the piece of baggage in order to solve the problem with the automatic sorting of the piece of baggage safely at a manual processing station.

A control station is provided after each group of loading stations in order to ensure that all the baggage is properly loaded on the sorting machine. With the barriers of lateral photoelectric cells, the position of each piece of baggage with reference to the conveyor on which it is loaded is checked upon passing of the carriages. The absence of the unstable piece of baggage with reference to its conveyor is therefore detected and the piece of baggage is localized on a next free or already occupied conveyor: in this case both pieces of baggage are sorted at the manual processing station.

The invention claimed is:

1. A device for sorting articles, the device comprising:
at least one loading station for automatically loading the articles, wherein each loading station comprises (i) at least one transport module for transporting the articles and (ii) a detection system to determine the position, shape, and size of the articles;
a set of cross-belt transport units, each cross-belt transport unit providing a supporting surface area for articles;
a supporting plate positioned between two adjacent transport units to permanently ensure continuity of a supporting surface between said two adjacent transport units over a width substantially equal to the supporting surface areas of the cross-belts; and
a control system for the at least one transport module;
wherein each loading station transfers the articles towards one or several of the transport units;
wherein the detection system detects a change in position of an article on the transport module during an acceleration phase of the transport module for transferring the article on one or several transport units;
wherein the control system controls the transport module according to said change in position of the article detected by the detection system;
wherein the transport belts comprise vertical profiles for keeping the articles on the transport units during their movements on the sorting device; the device further comprising monitoring and control pieces of equipment for detecting the position of the vertical profiles and positioning the belts before the loading station and during the loading of the articles in order to place the articles between vertical profiles.

2. The article sorting device according to claim 1, wherein the transport units comprise rollers for transporting the belt, the contact area of each roller with the belt being shorter than the belt width.

3. The article sorting device according to claim 2, further comprising parts having a curve surface which follows the profile of the outer cylinder of the respective roller thereby allowing the portion of the belt not supported by the roller to be maintained in position.

4. The article sorting device according to claim 3, wherein the parts with a curve surface have a slot that is tilted relative to a plane defined by the supporting surface of the articles on the transport unit for receiving the supporting plate.

5. The article sorting device according to claim 4, wherein the transport units comprise tilt adjustment modules for adjusting the tilt of the rollers for symmetrically spacing apart the ends of the rollers.

6. The device according to claim 1, wherein the monitoring and control pieces of equipment are able to detect a movement of the vertical profiles of a belt when an article is transported and to act on a driving motor of the belt in order to position the vertical profiles in a transport position.

7. The device according to claim 1, wherein the movement of the transport module of said at least one station for automatically loading articles is reversible.

8. An article sorting method comprising the following steps:
providing a device according to claim 1;
detecting, with the detection system, a change in position of the article on the transport module during the acceleration phase of the transport module for transferring the article onto one or several transport units; and
controlling, with the control system, the transport module according to the detected change in position of an article.

9. The method according to claim 8, wherein:
if the detected change in position of the article exceeds a threshold for allowing its automatic handling by the transport units, the loading station discharges it towards a manual processing area;
if the detected change in position of the article does not exceed a first preselected threshold, the loading station varies the speed of the transport module to dynamically correct the position of the article on this transport module to find a position compatible with the transfer on the transport units; or
if the detected change in position of the article exceeds a second preselected threshold, the loading station sends the article upstream from the detection system to allow determination of a new position of the article and to re-initiate a sequence for loading at a reduced speed towards one or several transport units.

10. The method according to claim 9, wherein the transport module comprises several transport belts, and wherein the variation of the speed of the transport module, in the case of detection of a change in position of the article below a first preselected threshold, comprises varying the speed of at least one of the transport belts.

11. An article sorting method comprising the following steps:
providing a device for sorting articles, the device comprising:
at least one loading station for automatically loading the articles, wherein each loading station comprises (i) at least one transport module for transporting the articles and (ii) a detection system to determine the position, shape, and size of the articles;
a set of cross-belt transport units, each cross-belt transport unit providing a supporting surface area for articles;
a supporting plate positioned between two adjacent transport units to permanently ensure continuity of a supporting surface between said two adjacent transport units over a width substantially equal to the supporting surface areas of the cross-belts; and
a control system for the at least one transport module;
wherein each loading station transfers the articles towards one or several of the transport units; wherein the detection system detects a change in position of an article on the transport module during an acceleration phase of the transport module for transferring the article on one or several transport units; wherein the control system controls the transport module according to said change in position of the article detected by the detection system; wherein the transport belts comprise vertical profiles for keeping the articles on the transport units during their movements on the sorting device;
detecting, with the detection system, a change in position of the article on the transport module during the acceleration phase of the transport module for transferring the article onto one or several transport units;
controlling, with the control system, the transport module according to the detected change in position of an article; and
pre-positioning the belts equipped with vertical profiles before the loading station and moving the belts during the transfer of the articles onto the transport units to place the articles between vertical profiles when they are found on the transport unit.

12. An article sorting method comprising the following steps:
providing a device according to claim 6;
detecting, with the detection system, a change in position of the article on the transport module during the acceleration phase of the transport module for transferring the article onto one or several transport units;
controlling, with the control system, the transport module according to the detected change in position of an article;
pre-positioning the belts equipped with vertical profiles before the loading station and moving the belts during the transfer of the articles onto the transport units to place the articles between vertical profiles when they are found on the transport unit; and
detecting movement of the vertical profiles of the belt, and if movement of the vertical profiles is detected when the article is transported, an action is performed on the motor of the belt to position the vertical profiles in a transport position.

13. The article sorting method according to claim 11, wherein long articles are placed on at least two adjacent transport units, ensuring the positioning of the long articles between the vertical profiles of said at least two transport units.

* * * * *